United States Patent [19]

Heilemann

[11] 3,991,937
[45] Nov. 16, 1976

[54] SOLAR-HEATED UNIT

[76] Inventor: Volkmar Heilemann, 127 Mountain View Road, Warren Township, N.J. 07060

[22] Filed: Nov. 12, 1975

[21] Appl. No.: 630,963

[52] U.S. Cl. .............................. 237/1 A; 126/271; 165/56; 237/69
[51] Int. Cl.² ............................................ F24J 3/02
[58] Field of Search .............. 237/1 A, 69; 126/270, 126/271; 165/48, 53, 56

[56] References Cited
UNITED STATES PATENTS

| | | | |
|---|---|---|---|
| 842,788 | 1/1907 | Huntoon | 126/271 |
| 1,004,888 | 10/1911 | McIntyre | 237/1 A |
| 1,425,174 | 8/1922 | Cartter et al. | 126/271 |
| 1,855,815 | 4/1932 | Abbot | 126/271 |
| 1,946,184 | 2/1934 | Abbot | 126/271 |
| 2,553,302 | 5/1951 | Cornwall | 237/69 |
| 2,729,431 | 1/1956 | Little | 165/56 |
| 2,784,945 | 3/1957 | Fodor | 237/69 |
| 3,847,136 | 7/1973 | Salvail | 126/271 |

FOREIGN PATENTS OR APPLICATIONS

| | | | |
|---|---|---|---|
| 272,027 | 7/1965 | Australia | 126/271 |
| 724,819 | 5/1932 | France | 126/271 |
| 1,069,317 | 7/1954 | France | 126/271 |

Primary Examiner—John J. Camby
Assistant Examiner—Henry C. Yuen

[57] ABSTRACT

In a preferred embodiment of the invention, a dwelling structure includes a floor heating structure including copper piping embedded within a concrete slab having insulation thereunder, having hot water circulated to the concrete slab conduits from a solar cell unit arranged along an upright outer wall of the dwelling at an elevation substantially beneath the floor heating structure and with a hot water containing reservoir vessel located at an elevation substantially above the floor heating structure in flow series in closed circuit for flow from the vessel to the floor heating structure downwardly to a lower portion of the solar cells and upwardly from an upper portion of the solar cells to the reservoir vessel, by heat convection flow, the solar cells being arranged substantially along the upright outer wall of the dwelling, and the individual cells being cylindrical rotatable cells rotatable around the elongated axis thereof, adapted such that the angle of incidence of sunlight rays is adjustable intermittently, with the solar cells extending with the longitudinal elongated axes substantially horizontal, but preferably with the outlet end being at least slightly elevated above the inlet end thereof, thereby enhancing heat convection flow therethrough.

1 Claim, 2 Drawing Figures

SOLAR-HEATED UNIT

This invention relates to a solar housing unit utilizing convection flow.

BACKGROUND OF THE INVENTION

Prior to the present invention, aside from initial cost of installation of solar heating systems, a primary cost thereof has resulted from one or more factors alone and in combination, such as a built-in inherent requirement that water of a reservoir heat transfer liquid be of at least a relatively high temperature as compared to normal room ambient temperature, in order to be operative and functional, due to the dissipation of heat energy during the transfer of the heat transfer medium from the heat reservoir tank to the radiator(s) or baseboard pipes, or the like, located at the diverse heating locations within the dwelling itself, as well as a major and significant cost of electricity for the pumps required to effect such circulation; there also is associated with most of the solar heating systems, roof-mounted solar cells which notoreously cause excessive heat exposure and damage to the roof itself as well as excessive added heat to the roof and attic space, which constitutes wasted heat energy as well as further requiring electrical energy for fan ventilation of the attic space particularly during the hotter days of summer.

SUMMARY OF THE INVENTION

Accordingly, objects of the invention include overcoming one or more difficulties and disadvantages of the types referred to above together with novel advantages and innovations.

Another object is to obtain a solar heating system devoid of roof-mounted solar cells, and associated problems.

Another object is to obtain an outer dwelling wall-mounted solar cells structure, devoid of here-to-fore required forced circulation.

Another object is to obtain a solar heating unit utilizing convection circulation.

Another object is to obtain a multipurpose central-heating heat-reservoir, utilizing heat-convection flow of solar-heated heat-transfer medium.

Another object is to enhance central heat reservoir solar heating deficiency, together with avoiding heretofore utilization of electrical power for prior required forced circulation for systems of the general types to which the present invention is directed.

Other objects become apparent from the preceding and following disclosure.

One or more objects are obtained by the invention as defined herein.

Broadly the invention may be defined as a solar-heated dwelling utilizing solar heat with a central heat-sink reservoir position for direct heating of space thereabove by utilization of the same as a floor, together with such floor heating structure being positioned with solar heating cells at an elevation substantially beneath floor or tank with the solar cells located and positioned along an upright exterior wall to the dwelling, and adapted such that closed circulation for the heat-transfer medium thereof flows cyclically by convection heating and circulation. In the floor heating structure, there are preferably flow-conduits therethrough, as preferably copper tubing embedded within concrete slab, preferably having insulation thereunder, such that all heat is utilized within room space above the floor heating structure. Preferably there is included within the closed cycle of flow, a reservoir vessel containing heat-transfer fluid such as hot water, with the vessel at a location substantially above the floor-heating concrete slab and flow conduits thereof. Preferably the inlet to the vessel admits hot water from the cells into an upper portion of the vessel and with the vessel having an outlet channeling hot water from a lower portion of the vessel to the conduits of the concrete slab, and flow from the concrete slab outlet(s) leading directly to a lower portion of the solar cells combination, and with outflow of hot water being channeled through solar cells outlets at upper portions of the solar cells combination. As a part of a preferred combination, the solar cells are of the rotatable cylindrical solar cells type, being rotatable along elongated axes thereof, for the intermittent adjustment from time to time of the positioning of the collector plate (by the revolving of the cylinder) for maximum efficiency by having a proper angle of incidence, preferably perpendicularly, of sun rays thereto. The cylindrical solar cells are preferably characterized by insulation beneath the collector plate of the individual cell, normally within the transparent tube in juxtaposition with a lower surface of the collector plate, such that the insulation insulates the plate and the sunrays from the roof or side of the house, as the case may be, along which the solar cells are preferably arranged, thereby both preventing inefficient loss of heat energy, as well as preventing exposure of structure of the house to excessive heat normally associated with solar cells and systems heretofore.

The invention may be better understood by making reference to the figures as follow.

THE FIGURES

DETAILED DESCRIPTION OF THE INVENTION

Figure 1:
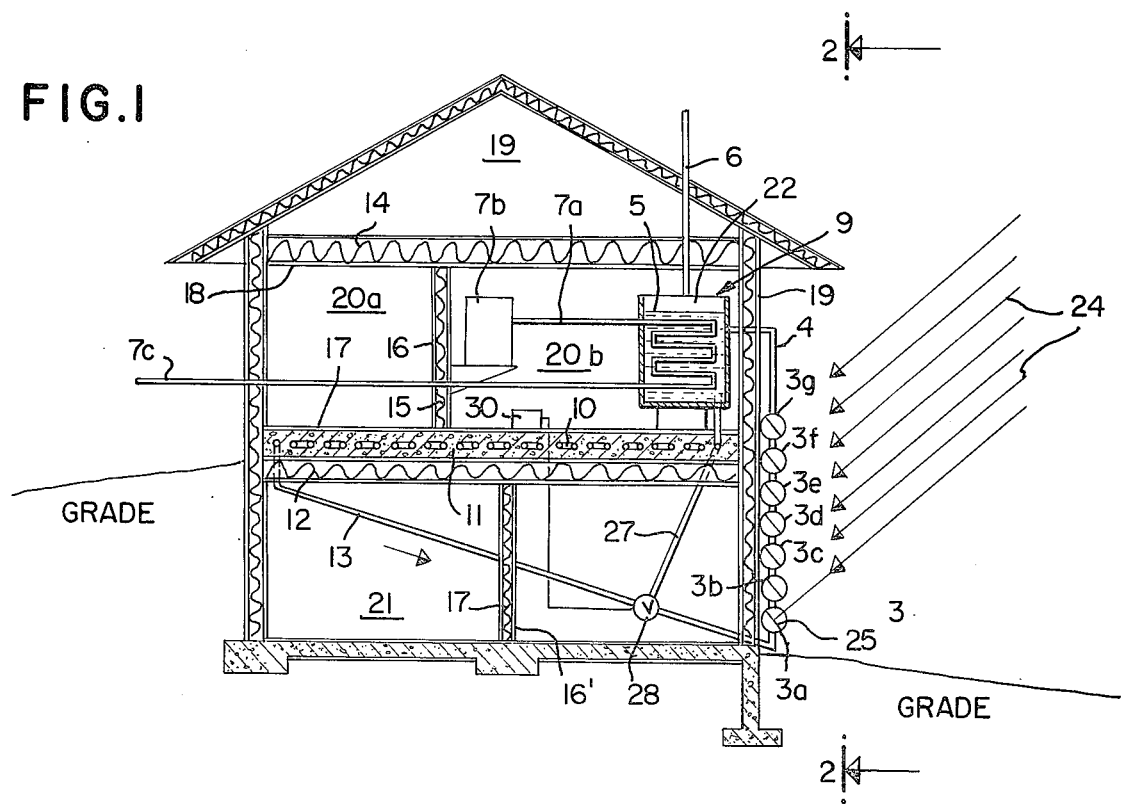
FIG. 1 illustrates a diagrammatic elevation side view of a structural embodiment of the invention without (devoid of showing) the near-side of the house being shown, in order to better illustrate the structural and positioning relationships and mechanism of functioning of the invention.
Figure 2:
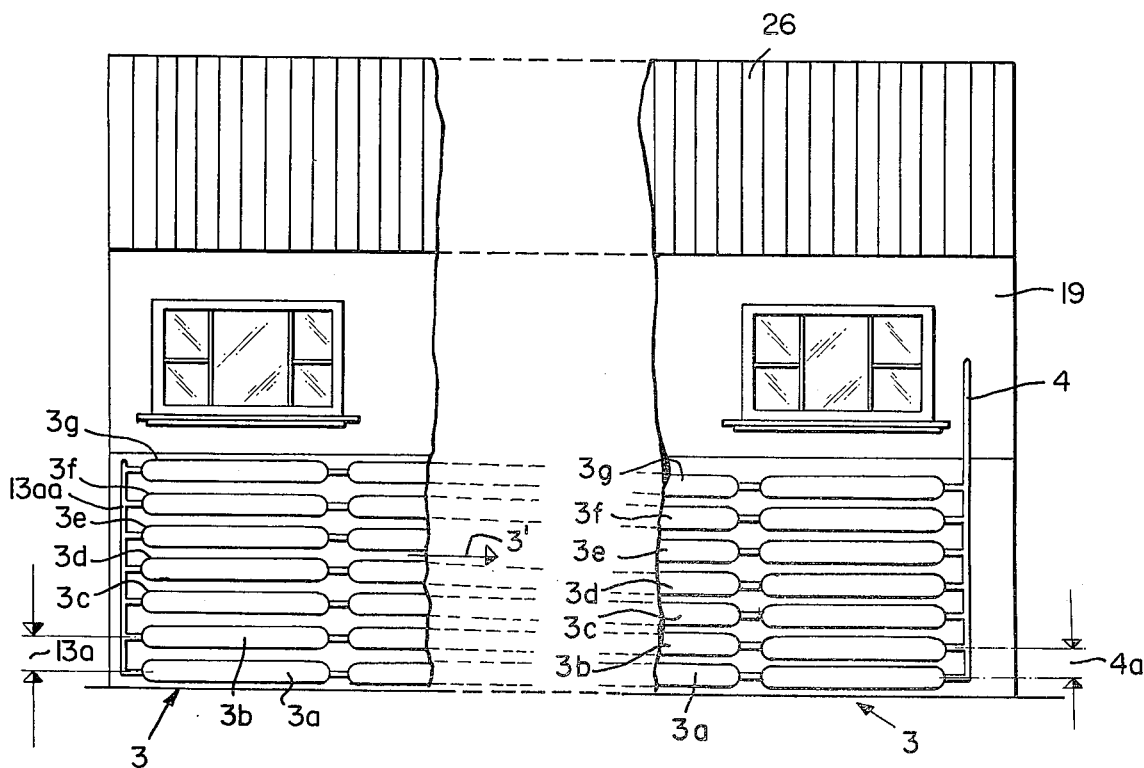
FIG. 2 illustrates a diagrammatic elevation side view as taken along lines 2—2 of FIG. 1, in an in-part view thereof of the side of the house and of the upright set of horizontally extending solar cells.

With detailed reference to each of FIGS. 1 and 2, both Figures disclose a common embodiment illustrative of the spirit of the invention. In particular, an upright set 3 of solar cells 3a through 3f, each of 3a–3f representing a series of individual cells in flow series for the coolant or heating media (such as typically water containing diethylene glycol) with the respective series in parallel flow with other series of the set 3, has the individual cells thereof rotated or otherwise positioned for most efficient heat collection by virtue of the heat collector plates 25 being preferably with the typically flat upper surfaces thereof substantially perpendicular to the sunlight rays 24.

As illustrated in FIG. 2, although the parallel series 3a through 3g and the individual cells of each series are extending substantially horizontally for flow of the heat transfer media substantially in directions as indicated by arrow $3^r$, particular attention is directed to the distance 13a, for example, being lesser than opposite-end distance 4a in a preferred embodiment, such that convection flow through the tubes (cells) is enhanced.

Heated heat media (heat transfer media) passes upwardly by convection flow through up-pipe 4 into preferably an upper portion of the reservoir tank 9 having vent 6, with typical water level 5, and with hot-water heating pipes for the heating of water by inlet cold water supply pipe 7c and coils or the like within tank 9 space 22, and hot water outlet pipe 7a to a hot water reserve tank 7b. The heat transfer media flows from preferably a lower portion of the tank 9 to and through conduits 10 which preferably are copper tubing, embedded within concrete slab 11 beneath floor 17, and having insulation 12 beneath the slab 11. It is to be understood that alternatively, as compared to a single serial line of flow through the conduits 10 which are typically serpentine in to and fro path of flow directions within the slab 11, there may be alternatively and/or jointly several parallel paths of flow in order preferably to better distribute heat evenly to diverse sections of the slab 11. From the one or more outlets of flow from the slab 11, down-pipe 13 conducts the cool heat transfer media into the FIG. 2-illustrated cells inlet pipe 13aa feeding the several sets 3a–3g; the illustrated sets are merely typical and do not limit the invention to any particular number of sets nor to any particular number of cells per set.

While the tank 9 is not essential to the invention, such is preferred for more even heating over a period of time, as well as possibly improved convection flow of the heat transfer media.

Important to a preferred embodiment of the invention is the insulation 12 beneath the slab 11, since a major heat loss of most floor heating systems is loss in a downward direction such as into the basement space 21, the present insulation 12 thus by a major percentage increasing the efficiency of the solar system of which maximum efficiency is essential for practical operation, resulting in both a storage of some heat energy to effect more prolonged heating of the spaces 20a and 20b, as well as causing a major and increased amount of heat energy to flow upwardly to these spaces 20a and 20b. While heretofore there has been emphasis on outer-wall insulation with conventional prior structures, while outer-wall insulation is desirable, nevertheless in this invention in a preferred embodiment thereof there is included insulation within inner dwelling walls as well which serves to hold the heat and to prevent wall drafts of air currents normally excessively circulating within the room. In like manner, while the major improvement of the invention has to do with first the convection-flow heating system as hereinafter claimed, the insulation beneath the slab being an essential for a preferred embodiment, there also is preferred the upper ceiling insulation 14 which retains the heat within the spaces 20a and 20b preventing loss to attic area 19 as well as the insulation 14 serving itself to retain heat which contributes to even heating of the below spaces 20a and 20b, the insulation 14 normally being above the ceiling 18. However, such insulation 14 may be a part of the ceiling structure 18, as well as the insulation 12 may be a part of the slab 11 if so desired and engineered. The space 12 as might be subdivided preferably to prevent drafts, also includes preferably inner-wall insulation 17 of inner wall 16'.

As is illustrated in the Figures, the set 3 is arranged along the outer side wall 19. It is contemplated to include flow-control valves (not illustrated) as might be desired to better regulate equal flow through the several series (of cells) in parallel. Insulation 14 also prevents excessive heat of space 19 during the summer which excessive heat might otherwise damage the roof and/or make the lower room spaces uncomfortably warm during the summer. The system may be easily drained by a lower-located drain (not shown) in a conventional manner, and there may be likewise a convention connection of the system to a water source for the recharging thereof with water at the beginning of the house-heating season. There also may be a by-pass to by-pass the slab 11 in order that the system may be retained operative in the summer to heat the hot water, although such by-pass is optional and is shown by by-pass pipe 27 as having flow typically controlled by selector valve 28 either manually controlled or controlled by an electrical lead and mechanism (motor) thereof 29 controlled by preferably the thermostat 30 at an upper surface of the floor 17; an advantage of such latter system is that excessive heating of the house may be avoided while heating for hot water heating purposes continues when water is shunted through the by-pass. Such by-pass pipe(s) may also have supplemental shunts to thereafter selectively heat other spaces if so desired.

It is within the scope and spirit of the invention to make such modifications and variations and substitution of equivalents as might be desired and within ordinary skill for this particular field of engineering.

I claim:

1. A solar heated dwelling unit comprising in combination: a building structure (1) having floor means (a) for circulating fluid therethrough and (b) for providing a heat-sink reservoir, and the floor means comprising a heat sink reservoir element, a floor means-inlet conduit connected to the heat-sink reservoir element and a floor means-outlet conduit connected to the heat-sink reservoir element, and (2) having spaced-apart wall structures-means for defining an enclosure inhabital space therebetween mounted on an upper face of the floor means and supportable of upper structure overhead, and (3) having ceiling means for enclosing said inhabital space, mounted on an upper portion of the spaced-apart wall structures-means; solar heating means (a) for providing solar cells mounted exterior to said building structure with operative exposure thereof to outdoor sunlight source such that solar heat energy is extracted into a circulation fluid thereof, and (b) for circulating fluid from the floor means-inlet conduit serially to and through the solar cells, to the floor means-outlet conduit in a substantially closed circulation cyclic flow, adapted such that heat becomes extracted from the circulating fluid into the heat sink reservoir-element and thereby provides thermal heat energy to said inhabital space for the heating thereof, said solar heating means being positioned at an elevation substantially beneath said floor means and adapted such that closed-flow circulation is by substantially heat convection, the solar heating means including a cells lower inlet conduit connected to the floor means-outlet conduit, and a cells upper outlet-conduit conductable of heated heat transfer fluid, and a heat transfer fluid-storage reservoir-vessel containable of liquid heat transfer fluid, as a part of the closed-flow circulation, the heat transfer fluid-storage reservoir-vessel being positioned substantially at a higher elevation than said floor means and having a reservoir-vessel inlet conduit for receipt of hot liquid heat transfer fluid from and being connected to said cells upper outlet conduit, and the heat transfer fluid-storage reservoir-vessel having a reservoir vessel outlet conduit for passage of hot liquid heat transfer fluid to and being connected to the floor means-inlet conduit, said reservoir-vessel outlet conduit being located at a lower portion of said heat transfer fluid-storage reservoir-vessel, and said heat transfer fluid-storage reservoir-vessel having said reservoir-vessel inlet conduit located at an upper portion of said reservoir vessel; said floor means' heat sink reservoir element including concrete having fluid-flow conduits embedded therein, adapted for conducting heated heat transfer fluid therethrough from and to solar cells by convection flow of said heat convection; and insulation means for preventing heat energy loss from (1) a lower face of said concrete, and (2) said wall structure-means; and a by-pass means for flow by-passing said floor means and for directing flow from said reservoir-vessel outlet conduit to said cells lower inlet conduit.

* * * * *